US008600427B2

(12) United States Patent  
Ibrahim et al.

(10) Patent No.: US 8,600,427 B2
(45) Date of Patent: Dec. 3, 2013

(54) METHOD AND SYSTEM FOR BLUETOOTH HID ACTIVITY PREDICTION FOR WIRELESS COEXISTENCE THROUGHPUT OPTIMIZATION

(75) Inventors: Brima Ibrahim, Aliso Viejo, CA (US); Prasanna Desai, Olivenhain, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/525,913

(22) Filed: Jun. 18, 2012

(65) Prior Publication Data

US 2012/0258667 A1 Oct. 11, 2012

Related U.S. Application Data

(63) Continuation of application No. 12/178,557, filed on Aug. 7, 2008, now Pat. No. 8,204,533.

(51) Int. Cl.
*H04B 7/00* (2006.01)
(52) U.S. Cl.
USPC ..... 455/522; 455/432.3; 455/433; 455/456.3; 370/311
(58) Field of Classification Search
USPC .......... 455/522, 432.3, 433, 456.3, 502, 41.2; 370/311, 345, 338
See application file for complete search history.

(56) References Cited

U.S. PATENT DOCUMENTS

| | | | | |
|---|---|---|---|---|
| 5,811,428 A * | 9/1998 | Suto et al. | ...................... | 514/256 |
| 6,731,669 B1 * | 5/2004 | Kudoh et al. | ................. | 375/133 |
| 6,834,194 B2 * | 12/2004 | Hunzinger | .................. | 455/452.2 |
| 7,194,642 B2 * | 3/2007 | Pontarelli | ...................... | 713/320 |
| 7,266,389 B2 * | 9/2007 | Karaoguz et al. | .......... | 455/556.1 |
| 7,330,740 B2 * | 2/2008 | Bennett et al. | ................. | 455/574 |
| 7,421,291 B2 * | 9/2008 | Karaoguz et al. | ............. | 455/574 |
| 7,463,886 B2 * | 12/2008 | Salokannel et al. | ........ | 455/426.1 |
| 7,558,862 B1 * | 7/2009 | Tyukasz et al. | ............... | 709/227 |
| 7,610,057 B2 * | 10/2009 | Bahl et al. | ...................... | 455/522 |
| 7,653,017 B2 * | 1/2010 | Huylebroeck | ................ | 370/311 |
| 8,204,533 B2 | 6/2012 | Ibrahim et al. | | |
| 2003/0013454 A1 * | 1/2003 | Hunzinger | ..................... | 455/452 |
| 2003/0114206 A1 * | 6/2003 | Timothy et al. | ............... | 455/575 |
| 2004/0116075 A1 * | 6/2004 | Shoemake et al. | .......... | 455/41.2 |
| 2005/0026637 A1 * | 2/2005 | Fischer et al. | ................ | 455/502 |
| 2005/0034001 A1 * | 2/2005 | Pontarelli | ...................... | 713/320 |
| 2005/0170776 A1 * | 8/2005 | Siorpaes | ...................... | 455/41.2 |
| 2005/0176473 A1 * | 8/2005 | Melpignano | .................. | 455/574 |
| 2005/0239497 A1 * | 10/2005 | Bahl et al. | .................. | 455/552.1 |
| 2005/0245292 A1 * | 11/2005 | Bennett et al. | ................ | 455/574 |
| 2006/0120339 A1 * | 6/2006 | Akiyama et al. | .............. | 370/338 |
| 2006/0252418 A1 * | 11/2006 | Quinn et al. | ................... | 455/423 |

(Continued)

*Primary Examiner* — Minh D Dao
(74) *Attorney, Agent, or Firm* — Sterne, Kessler, Goldstein & Fox P.L.L.C.

(57) ABSTRACT

A host device may be enabled to support a plurality of wireless interfaces, wherein some of these interfaces may be utilized to support human interface device (HID) based communication. The host device may be enabled to monitor activity of HID devices based on communications via HID capable wireless interfaces, may predict future use of the HID devices based on the monitoring, and may manage sniff communication that is utilized to track and/or detect activities in the HID devices. The management of the sniff communication may comprise adjusting characteristics of the sniff communication to enable improving throughput of other wireless interfaces available via the host device that may be affected by the sniff communication. The adjustment of the characteristics of sniff communication may comprise adjusting, statically and/or dynamically, length of sniff intervals and/or designating of sniff packets as high priority requests.

20 Claims, 4 Drawing Sheets

(56) References Cited

U.S. PATENT DOCUMENTS

| | | |
|---|---|---|
| 2007/0010261 A1* | 1/2007 | Dravida et al. ............ 455/456.3 |
| 2008/0056285 A1* | 3/2008 | Quinn et al. .................. 370/401 |
| 2008/0057967 A1* | 3/2008 | Goldsmith .................... 455/447 |
| 2008/0089261 A1* | 4/2008 | Wentink ........................ 370/311 |
| 2008/0117850 A1* | 5/2008 | Agrawal et al. ............... 370/311 |
| 2008/0123610 A1* | 5/2008 | Desai et al. ................... 370/339 |
| 2008/0140868 A1* | 6/2008 | Kalayjian et al. ................. 710/8 |
| 2008/0267100 A1* | 10/2008 | Sollenberger et al. ........ 370/310 |
| 2008/0303681 A1* | 12/2008 | Herz et al. .................... 340/671 |
| 2009/0003303 A1* | 1/2009 | Zhu et al. ...................... 370/345 |
| 2009/0003620 A1* | 1/2009 | McKillop et al. ............... 381/80 |
| 2009/0022120 A1* | 1/2009 | Buer et al. .................... 370/338 |
| 2009/0023422 A1* | 1/2009 | MacInnis et al. ............. 455/411 |
| 2009/0080401 A1* | 3/2009 | Zhu et al. ...................... 370/343 |
| 2009/0137206 A1* | 5/2009 | Sherman et al. ............. 455/41.2 |
| 2009/0172210 A1* | 7/2009 | Kesselman et al. ............. 710/16 |
| 2009/0286534 A1* | 11/2009 | Garg et al. ................. 455/432.1 |
| 2009/0313689 A1* | 12/2009 | Nystrom et al. ................... 726/9 |
| 2009/0318131 A1* | 12/2009 | Aaron ........................... 455/423 |
| 2010/0076685 A1* | 3/2010 | Eidehall ........................ 701/301 |
| 2010/0120362 A1* | 5/2010 | Walley et al. ................. 455/41.2 |
| 2010/0164839 A1* | 7/2010 | Lyons et al. ..................... 345/2.3 |
| 2010/0304783 A1* | 12/2010 | Logan et al. ................. 455/552.1 |
| 2010/0315951 A1* | 12/2010 | Bugenhagen ................. 370/241 |
| 2010/0322287 A1* | 12/2010 | Truong et al. ................. 375/133 |

* cited by examiner

METHOD AND SYSTEM FOR BLUETOOTH HID ACTIVITY PREDICTION FOR WIRELESS COEXISTENCE THROUGHPUT OPTIMIZATION

CROSS-REFERENCE TO RELATED APPLICATIONS/INCORPORATION BY REFERENCE

This application is a continuation of U.S. application Ser. No. 12/187,557, filed on Aug. 7, 2008, which will issue as U.S. Pat. No. 8,204,533 on Jun. 19, 2012, which is incorporated by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to wireless communication. More specifically, certain embodiments of the invention relate to a method and system for Bluetooth HID activity prediction for wireless coexistence throughput optimization.

BACKGROUND OF THE INVENTION

The field of wireless communication has seen dramatic growth the last few years. In today's world, most people use their wireless communication devices, for example mobile phones, for various purposes, business and personal, on a constant and daily basis. Society is truly becoming a wireless one as a lot of wireless solutions have been introduced, and have made tremendous strides into everyday's life.

Mobile phones have become a near absolute necessity in today's world. While mobile technology originally evolved from traditional land-based communication technologies, and was merely intended to add an element of mobility to the traditional telephony service, this technology has grown beyond that initial purpose. Many modern mobile technologies, including such technologies as GSM/GPRS/EDGE, UMTS, and CDMA2000, incorporate substantial data capabilities. Most of today's mobile services comprise such features as text messaging, audio/video streaming, and web browsing. Modern mobile devices, for example cell phones and/or smart phones, may be utilized to support additional services via other wireless interfaces, for example, wireless personal area networks (WPAN) and/or wireless local area network (WLAN) interfaces.

The use of wireless personal area networks (WPAN) continues to gain popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). WPAN may be based on standardized technologies; for example Class 2 Bluetooth (BT) technology.

While WPAN may be very beneficial for certain applications, other applications may require larger service areas and/or capabilities. To satisfy such needs, other technologies have been developed to provide greater wireless service. Wireless local area networks (WLAN) systems may operate within a 100-meter range, for example. In contrast to the WPAN systems, WLAN provide connectivity to devices that are located within a slightly larger geographical area, such as the area covered by a building or a campus, for example. WLAN systems are generally based on specific standards, for example IEEE 802.11 standard specifications, and typically operate within a 100-meter range, and are generally utilized to supplement the communication capacity provided by traditional wired Local Area Networks (LANs) installed in the same geographic area as the WLAN system.

Some WLAN systems may be operated in conjunction with WPAN systems to provide users with an enhanced overall functionality. For example, Bluetooth technology may be utilized to connect a laptop computer or a handheld wireless terminal to a peripheral device, such as a keyboard, mouse, headphone, and/or printer, while the laptop computer or the handheld wireless terminal is also connected to a campus-wide WLAN network through an access point (AP) located within the building. Also, mobile technology may allow use of the mobile phone as a form of wireless modem that allows connecting a laptop, for example, to the internet via a mobile network.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for Bluetooth HID activity prediction for wireless coexistence throughput optimization, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for Bluetooth HID activity prediction for wireless coexistence throughput optimization. In various embodiments of the invention, a host device may be enabled to support a plurality of wireless interfaces, wherein one or more of these wireless interfaces may be utilized to support human interface device (HID) based communication with HID devices. The host device may be enabled to monitor activity of the HID devices based on communications via HID capable wireless interfaces and may predict or determine future use of the HID devices based on the monitoring. The host device may be operable to manage sniff communication which may be utilized in the host device, via available HID capable interfaces, to track and/or detect activities in the HID devices.

The management of the sniff communication may comprise adjusting characteristics of the sniff communication to enable improving throughput of other wireless interfaces available via the host device. The dependency between the HID capable interfaces and the other wireless interfaces may be based on proximity of the frequencies used to transmit and/or receive via the wireless interfaces. The HID capable interfaces may comprise wireless personal area network (WPAN) interfaces, which may comprise Bluetooth interfaces. The other wireless interfaces may comprise wireless local area network (WLAN) based interfaces, which may comprise WiFi interfaces. The adjustment of the characteristics of sniff communication may comprise adjusting, statically and/or dynamically, length of sniff intervals and/or designating of sniff packets as high priority requests.

Figure 1:
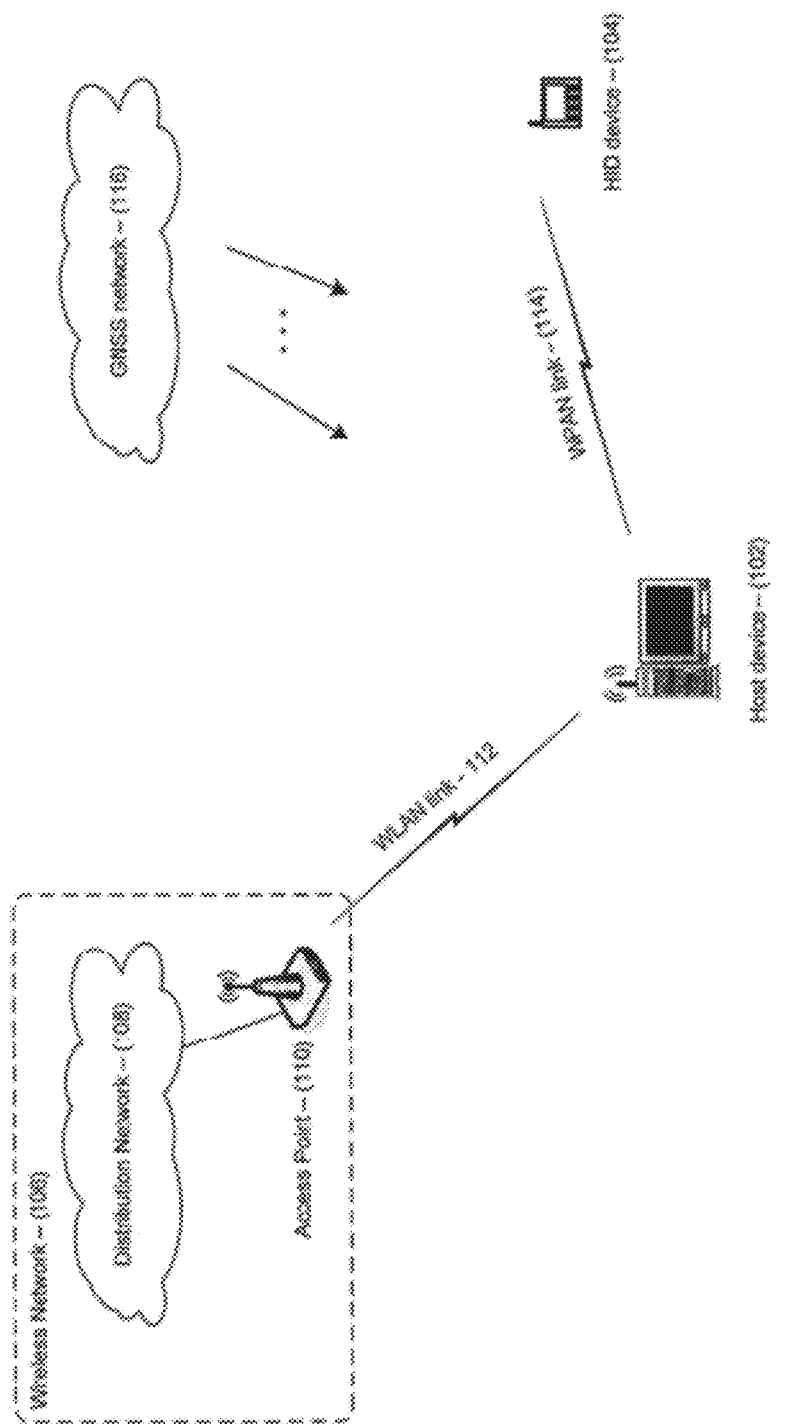
FIG. 1 is a block diagram that illustrates a host device utilized to communicate with a human interface device (HID) and a wireless local area network (WLAN), which may be utilized in accordance with an embodiment of the invention.

FIG. 1 is a block diagram that illustrates a host device utilized to communicate with a human interface device (HID) and a wireless local area network (WLAN), which may be utilized in accordance with an embodiment of the invention. Referring to FIG. 1, there is shown a host device 102, a human interface device (HID) 104, a wireless network 106, a distribution network 108, an access point 110, a wireless local area network (WLAN) link 112, a wireless personal area network (WPAN) link 114, and a global navigation satellite system (GNSS) network 116.

The host device 102 may comprise suitable logic, circuitry and/or code that may enable performing one or more tasks requested via users of the host device 102. The invention may not be limited to a specific device, but may comprise for example, a general purpose processing device, a specialized processing device, a specialized peripheral device, or suitable hardware, firmware, software and/or code, which may be enabled to perform a job requested via users of the host device 102. For example, the host device 102 may also enable personal communication, audio/video recording and/or playing, gaming operations, and/or various other tasks, which may be requested via the host device 102 by a user. The host device 102 may be enabled to communicate with one or more of supported wireless and/or wired networks while performing tasks requested via the host device 102 for example. A user of the host device 102 may utilize the host device 102 directly, via supported user interfaces within the host device 102, and/or indirectly via available networks and/or via other devices, such as the HID device 104, which may interact with the host device 102 via a communication interface, for example the WPAN link 114. Exemplary direct supported user interfaces may comprise touchscreen input, audio input, and hardware and/or software keyboard input. The host device 102 may also comprise functionality that may enable utilizing one or more of available networks, to connect to available devices and/or resources for example. The network connectivity may be achieved, for example, via one or more wireless communication interfaces, including, for example, WLAN interfaces, which may be operable to provide connectivity to corresponding networks and/or devices.

The HID device 104 may comprise suitable logic, circuitry and/or code that may enable performing some functionality in conjunction with the use of the host device 102 based on human interactions. For example, the HID device 104 may comprise a wireless capable computer mouse that may be utilized, in conjunction with the host device 102 to facilitated communicating user's input based on the mouse spatial coordinates. The host device 102 may interact with the HID device 104 via one or more PAN interfaces, which may be based on wired and/or wireless PAN protocols. For example, the host 102 may communicate with the HID device 104 via the WPAN link 114. The WPAN link 114 may comprise a communication link that is based on a standardized protocol for inter-device short range communication. For example, the WPAN link 114 may correspond to Bluetooth, ZigBee, and/or Ultra-Wideband (UWB) connections between the host device 102 and the PAN device 104.

The wireless network 106 may comprise the distribution network 108, a plurality of the access point 110, and suitable logic, circuitry and/or code that may enable implementing a functional block corresponding to one or more wireless technologies. Exemplary wireless technologies may comprise for example the Wireless Fidelity (WiFi) protocol, other IEEE 802.11 based standards, and/or the Worldwide Interoperability for Microwave Access (WiMAX, IEEE 802.16) architecture. The distribution network 108 may comprise suitable hardware, logic, circuitry, and/or code that may be enabled to operate as a backbone network that may be responsible for transport and link functionality for a plurality of access points in the wireless network 106. The access point 110 may comprise suitable hardware, logic, circuitry, and/or code that may provide access network to the wireless network 106 for wireless capable devices, for example the host device 102. The WLAN link 112 may comprise a communication link that is based on a standardized protocol for wireless local area network communication. For example, the WLAN link 126 may correspond to WiFi and/or WiMAX connections between the host device 102 and the access point 110.

The GNSS network 116 may comprise a plurality of orbiting satellite nodes in a global navigation satellite system, a plurality of land-based support entities, and may also comprise suitable logic, circuitry and/or code that may enable communication with land-based devices, for example the host device 102 and/or the HID device 104, via satellite links to provide, for example, navigational capabilities. The GNSS network 116 may comprise, for example, a Global Positioning System (GPS) based network, a GLONASS based network, and/or a Galileo based network.

In operation, the host device 102 may be utilized to perform one or more tasks requested via users of the host device 102 and/or the HID device 104. For example, the host device 102 may enable personal communication, playing and/or recording audio/video streams, and/or may be utilized as to perform data processing and/or storage. The host device 102 may also enable connectivity via a plurality of available communication interfaces, which may be necessary to perform requested tasks. For example, the host device 102 may utilize the WLAN link 112 to access the wireless network 106 via the access point 110 and the distribution network 208, via WiFi and/or WiMAX connections for example. The host device 102 may also receive satellite navigational signals, from the GNSS network 116 for example, to enable performing positional related tasks. The host device 102 may be utilized via the HID device 104, which may be enabled to communicate with the host device 102, for example, via the WPAN link 114. The HID device 104 may be utilized to communicate, to the host device 102 via the WPAN link 114, requests and/or commands inputted by user of the HID device 104. Because use of the HID device 104 may not be continuous, the host device 102 may comprise a functionality to enable tracking of, and/or detecting of use of the HID device 104, via 'sniff' communication for example.

Host devices, for example the host device 102, may set up 'sniff' communication to enable checking for and/or detecting of activity by users via HID devices, for example the HID device 104. Sniff communication may comprise various characteristics, including, for example, length of sniff intervals and/or designation as high priority requests, wherein sniff based communication may be may nominally be set to high coexistence priority. This is because sniff transactions with HID device, such as a mouse for example, need to typically be prioritized higher than other data communication performed via wireless connections, such as web-browsing for example, since missing reception and/or transmission of packets from/to the HID device, may result in degraded performance of the HID device, for example a "sluggish" and/or "jerky" movement of mouse cursor on a screen where the HID device may be a wireless mouse, deleteriously affecting the user experience. The host device 102 may, for example, setup sniff intervals of about 12.5 ms to poll for activity by the HID device 104. The host device 102 may also designate sniff packets, which comprise packets communicated at end of sniff intervals, as high priority exchange traffic. Sniff packets that are designated as high priority exchange may, where other transmission and/or reception operation may be performed via sufficiently proximate bandwidth and/or frequencies, preempt such other communication. For example, because transmission and/or reception of Bluetooth and WiFi communication is performed around the 2.4 GHz bandwidth, non-HID sniff related packet communication in the host device 102, including, for example, packet communication via the WLAN link 112, maybe adversely affected due to transmission of sniff packets via the WPAN interface 114.

Transmission of high priority request sniff packets every 12.5 ms may affect the WLAN throughput since these sniff packets may be transmitted in lieu of WLAN based data packets, where the sniff packets may be designated as high priority requests. The use of HID devices, however, may be inconsistent and/or sporadic, wherein bursts of activity by users of HID devices, for example, may be inter-spaced with long periods of inaction. Accordingly, the use of constant sniff intervals with strictly high priority request transmission may be inefficient and/or unnecessary. While effects on throughput of other, non-HID related, communication may be remedied by simply denying the HID-related high priority sniff requests, this may degrade prosperity of use of the HID devices as actions attempted by the user may be missed during times the sniff requests are being denied.

Figure 2:
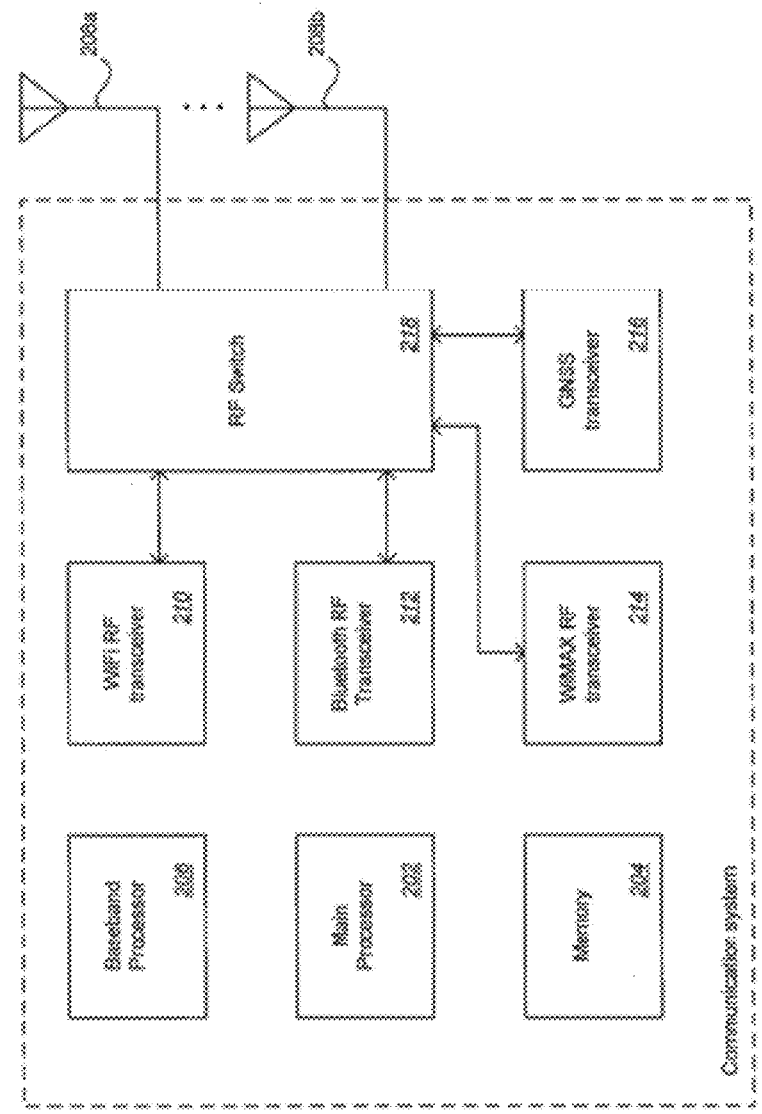
FIG. 2 is a block diagram that illustrates an exemplary communication system in a device that enables signal management and switching between a Bluetooth (BT) and Wireless Fidelity (WiFi) RF transmission and reception, in accordance with an embodiment of the invention.

In an exemplary embodiment of the invention, the characteristics of sniff communication may be modified by host devices based on prediction of future use of HID devices, via HID based wireless interfaces. The prediction may be determined based on monitoring current activity of the HID devices, via the HID based interfaces. For example, where the HID device 104 may comprise a wireless mouse, the characteristics of spatial movement of wireless mouse to determine said current activity and/or subsequent activity of wireless mouse. Exemplary characteristics of the spatial movement may comprise speed and/or acceleration of movement of said wireless mouse. The host device 102 may be enabled to modify, for example, the length (duration) of sniff intervals and/or the high priority request designation. The host device 102 may be enabled to extend the sniff interval to be greater than 12.5 ms to reduce potential instances of interruption to other, non-HID related communication. The host device 102 may also be enabled to only designate some of the sniff packets as high priority request communication, wherein transmission of other packets via non-HID based wireless interfaces may not necessarily be preempted by transmission of sniff packets when these sniff packets are not designated as high priority requests. In another embodiment of the invention, similar modifications and/or adjustments may be performed on other types of communication, based on the Bluetooth protocol, which may be utilized in polling and/or interaction with HID devices. For example, similar modifications and/or adjustments may be made when utilizing Bluetooth low energy based communication via a host device to interact with and/or poll HID devices that may be located within Bluetooth low energy range of the host device FIG. 2 is a block diagram that illustrates an exemplary communication system in a device that enables signal management and switching between a Bluetooth (BT) and Wireless Fidelity (WiFi) RF transmission and reception, in accordance with an embodiment of the invention. Referring to FIG. 2, there is there is shown a communication system 200, a main processor 202, a memory 204, a baseband processor 206, a plurality of antenna 208a, . . . , 208b, a Bluetooth RF transceiver 210, a WiFi RF transceiver 212, a WiMAX transceiver 214, a GNSS transceiver 216, and an RF switch 218.

The communication system 200 may comprise the main processor 202, the memory 204, the baseband processor 206, the plurality of antenna 208a, . . . , 208b, the Bluetooth RF transceiver 210, the WiFi RF transceiver 212, the WiMAX transceiver 214, the GNSS transceiver 216, and the RF switch 218. The communication system 200 may also comprise suitable logic, circuitry, and/or code that may enable receiving, transmitting, and processing RF signals. For example, the communication system 200 may be integrated within a device, for example the host device 102, to enable RF signal transmission and/or reception, during WiFi and/or Bluetooth communication, for example, via the WLAN link 112 and/or the WPAN link 114, respectively.

The main processor 202 may comprise suitable logic, circuitry, and/or code that may enable control and/or data processing operations in the communication system 200. The main processor 202 may be utilized to control at least a portion of the memory 204, the baseband processor 206, the Bluetooth RF transceiver 210, the WiFi RF transceiver 212, the WiMAX transceiver 214, the GNSS transceiver 216, and/or the RF switch 218. In this regard, the main processor 202 may generate at least one signal for controlling operations within the communication system 200. The main processor 202 may also enable execution of applications that may be utilized by the communication system 200. For example, the main processor 202 may execute applications that may enable displaying and/or interacting with content received via RF signals in the communication system 200. The main processor 202 may also comprise suitable logic, circuitry, and/or code that may enable baseband frequency signals processing. In this regard, the main processor 202 may process and/or handle signals received from the Bluetooth RF transceiver 210, the WiFi RF transceiver 212, the WiMAX transceiver 214, and/or the GNSS transceiver 216; and/or signals that may be transmitted via the Bluetooth RF transceiver 210, the WiFi RF transceiver 212, the WiMAX transceiver 214, and/or the GNSS transceiver 216.

The memory 204 may comprise suitable logic, circuitry, and/or code that may enable storage of data, code, and/or other information utilized by the communication system 200.

For example, the memory 204 may be utilized for storing processed data generated, and/or execution code that may be utilized by the main processor 202. The memory 204 may also be utilized to store information, such as configuration information, that may be utilized to control the operation of at least a portion of the communication system 200. For example, the memory 204 may comprise information necessary to configure the Bluetooth RF transceiver 210, the WiFi RF transceiver 212, the WiMAX transceiver 214, and/or the GNSS transceiver 216, to enable reception and/or transmission of RF signals in appropriate frequency bands.

The baseband processor 206 may comprise suitable logic, circuitry, and/or code that may be adapted to process received baseband signals via RF transceivers. The baseband processor 206 also may comprise suitable logic, circuitry, and/or code that may be adapted to process baseband signals for transmission via RF transceivers. For example, the baseband processor 206 may be utilized to process baseband signals transmitted and/or received via the Bluetooth RF transceiver 210, the WiFi RF transceiver 212, the WiMAX transceiver 214, and/or the GNSS transceiver 216 in the communication system 200. Although the baseband processor 206 may be depicted as a single block, the invention need not be so limited. Accordingly, other embodiments of the invention may comprise a plurality of baseband processors for processing signals to and/or from available RF transceivers.

Each of plurality of antenna 208a, . . . , 208b may comprise suitable logic, circuitry, and/or code that may enable reception and/or transmission of RF signals within certain bandwidths. For example, the one or more of the plurality of antenna 208a, . . . , 208b may enable RF transmission and/or reception via the 2.4 GHz, which may be suitable for Bluetooth and/or WiFi RF transmissions and/or receptions. The plurality of antenna 208a, . . . , 208b may be communicatively coupled to the RF switch 218.

The Bluetooth RF transceiver 210 may comprise suitable logic, circuitry, and/or code that may enable processing of transmitted and/or received Bluetooth RF signals via, for example, the RF switch 218 and one or more of the plurality of antenna 208a, . . . , 208b. For example, the Bluetooth RF transceiver 210 may enable receiving of RF signals at, for example, approximately the 2.4 GHz frequency band. In this regard, the Bluetooth RF transceiver 210 may be enabled to generate signals, such as local oscillator signals, for the reception and processing of Bluetooth RF signals. The Bluetooth RF transceiver 210 may be enabled to perform necessary conversions between received RF signals and baseband frequency signals that may be proceed via digital baseband processors, for example. The Bluetooth RF transceiver 210 may perform direct down-conversion of the received RF signals to a baseband frequency signal, for example. In some instances, the Bluetooth RF transceiver 210 may enable analog-to-digital conversion of baseband signal components before transferring the components to digital baseband processors. The Bluetooth RF transceiver 210 may also enable transmission of Bluetooth RF signals via the RF switch 218 and/or the plurality of antenna 208a, . . . , 208b at, for example, approximately 2.4 GHz frequency band and/or other designated frequency band. In this regard, the Bluetooth RF transceiver 210 may be enabled to generate signals, such as local oscillator signals, for the transmission and/or processing of Bluetooth signals. The Bluetooth RF transceiver 210 may be enabled to perform necessary conversions between baseband frequency signals, generated via digital baseband processors for example, and transmitted RF signals. In some instances, the Bluetooth RF transceiver 210 may enable digital-to-analog conversion of baseband signals components.

The WiFi RF transceiver 212 may comprise suitable logic, circuitry, and/or code that may enable processing of transmitted and/or received WiFi signals via, for example, the RF switch 218 and one or more of the plurality of antenna 208a, . . . , 208b. For example, the WiFi RF transceiver 212 may enable receiving RF signals at, for example, approximately the 2.4 GHz frequency band. In this regard, the WiFi RF transceiver 212 may be enabled to generate signals, such as local oscillator signals, for the reception and processing of WiFi signals. The WiFi RF transceiver 212 may be enabled to perform necessary conversions between received RF signals and baseband frequency signals that may be processed via one or more digital baseband processors, for example. The WiFi RF transceiver 212 may be enabled to perform direct conversion of the received RF signals to a baseband frequency signal, for example. In some instances, the WiFi RF transceiver 212 may enable analog-to-digital conversion of baseband signal components before transferring the components to digital baseband processors. The WiFi RF transceiver 212 may also enable transmission of WiFi signals at, for example, approximately 2.4 GHz frequency band. In this regard, the WiFi RF transceiver 212 may be enabled to generate signals, such as local oscillator signals, for the transmission and processing of WiFi signals. The WiFi RF transceiver 212 may be enabled to perform necessary conversions between baseband frequency signals, generated via digital baseband processors for example, and transmitted RF signals. In some instances, the WiFi RF transceiver 212 may enable digital-to-analog conversion of baseband signals components.

The WiMAX RF transceiver 214 may comprise suitable logic, circuitry, and/or code that may enable processing of transmitted and/or received WiMAX based signals via, for example, the RF switch 218 and one or more of the plurality of antenna 208a, . . . , 208b. For example, the WiMAX RF transceiver 214 may enable receiving and/or transmitting RF signals in the 2-66 GHz frequency range via WiMAX connections, through the WLAN link 102 for example. In this regard, the WiMAX RF transceiver 214 may be enabled to generate signals, such as local oscillator signals, for the reception and processing of WiMAX signals. The WiMAX RF transceiver 214 may be enabled to perform necessary conversions between received RF signals and baseband frequency signals that may be processed via one or more digital baseband processors, for example.

The WiMAX RF transceiver 214 may be enabled to perform direct conversion of the received RF signals to a baseband frequency signal, for example. In some instances, the WiMAX RF transceiver 214 may enable analog-to-digital conversion of baseband signal components before transferring the components to digital baseband processors. The WiMAX RF transceiver 214 may also be enabled to generate signals, such as local oscillator signals, for the transmission and processing of WiMAX signals. The WiMAX RF transceiver 214 may be enabled to perform necessary conversions between baseband frequency signals, generated via digital baseband processors for example, and transmitted RF signals. In some instances, the WiMAX RF transceiver 214 may enable digital-to-analog conversion of baseband signals components.

The GNSS transceiver 216 may comprise suitable logic, circuitry, and/or code that may enable processing of received and/or transmitted GNSS based signals via, for example, the RF switch 218 and one or more of the plurality of antenna 208a, . . . , 208b. For example, the GNSS transceiver 216 may enable receiving GPS, GLONASS, and/or Galileo based satellite signals. In this regard, the GNSS transceiver 216 may be enabled to generate signals, such as local oscillator signals, for the reception and processing of GNSS signals. The GNSS transceiver 216 may be enabled to perform necessary conversions between received GNSS signals and baseband frequency signals that may be processed via one or more digital baseband processors, for example. The GNSS transceiver 216 may be enabled to perform direct conversion of the received GNSS signals to a baseband frequency signal, for example. In some instances, the GNSS transceiver 216 may enable analog-to-digital conversion of baseband signal components before transferring the components to digital baseband processors.

The RF switch 218 may comprise suitable logic, circuitry, and/or code that may enable switching and/or routing of signals generated and/or processed via the Bluetooth RF transceiver 210, the WiFi RF transceiver 212, the WiMAX transceiver 214, and/or the GNSS transceiver 216, which may be transmitted and/or received via one or more of the plurality of antenna 208a, . . . , 208b.

In operation, the communication system 200 may enable RF transmission and/or reception pertaining to different wireless and/or wired interfaces and/or protocols. The main processor 202, the memory 204, and the baseband processor 206 may be utilized to control and/or support RF communication and/or signal processing via the communication system 200. For example, WiFi signals may be received and/or transmitted via one or more of the plurality of antenna 208a, . . . , 208b, the RF switch 218, and the WiFi RF transceiver 212. The transmitted and/or received WiFi signals may be converted from and/or to baseband signals, which may be processed via the baseband processor 206. Bluetooth RF signals may be received and/or transmitted via one or more of the plurality of antenna 208a, . . . , 208b, the RF switch 218, and the Bluetooth RF transceiver 210. The transmitted and/or received Bluetooth RF signals may be converted from and/or to baseband signals, which may be processed via the baseband processor 206. WiMAX RF signals may be received and/or transmitted via one or more of the plurality of antenna 208a, . . . , 208b, the RF switch 218, and the WiMAX RF transceiver 214. The transmitted and/or received WiMAX RF signals may be converted from and/or to baseband signals, which may be processed via the baseband processor 206. GNSS signals may be received and/or transmitted via one or more of the plurality of antenna 208a, . . . , 208b, the RF switch 218, and the GNSS transceiver 216. The received GNSS signals may then be converted to baseband signals, which may be processed via the baseband processor 206.

In an exemplary embodiment of the invention, the communication system 200 may be integrated in host device, for example the host device 102, to enable performing management of sniff communication that may be performed during use of HID devices, and/or necessary switching among available wireless interfaces during RF transmission and/or reception pertaining to supported wireless interfaces. A host device, for example the host device 102, may set up 'sniff' communication to enable checking for and/or detecting of activity by users of one or more HID devices, for example the HID device 104. For example, the communication system 200 may enable transmission of sniff packets, over Bluetooth interface, by the Bluetooth RF transceiver 212, via the RF switch 218 and the plurality of antenna 208a, . . . , 208b.

The communication system 200 may also enable managing the sniff communication, for example via the main processor 202, the memory 204, and/or the baseband processor 206. For example, the communication system 200 may enable setting up sniff intervals, wherein sniff packets may be transmitted at predetermined intervals to poll for activity in HID devices. The communication system 200 may also enable prioritization of traffic. For example, the communication system 200 may be operable to designate sniff packets as high priority exchange traffic. The sniff packets that are designated as high priority exchange may preempt other packet communication performed via the communication system 200, including, for example, WiFi packet communication by the WiFi RF transceiver 210, via the RF switch 218 and the plurality of antenna 208a, . . . , 208b. The transmission of high priority request sniff packets at the end of the sniff intervals, therefore, may affect the WiFi communication throughput in the communication system 200 because the sniff packets may be transmitted at the expense of WiFi packets. However, because use of HID devices may be inconsistent and/or sporadic, wherein bursts of activity by the user may be inter-spaced with long periods of inaction, the use of constant sniff intervals with strictly high priority request transmission may be inefficient and/or unnecessary.

The communication system 200 may be enabled to adjust the characteristics of sniff communication, based on prediction or determining future use of HID devices. For example, the prediction may be determined by monitoring current activity of the HID devices via the HID based interfaces, to improve communication throughput via other wireless interfaces. For example, the communication system 200 may be enabled to modify the length of sniff intervals and/or the high priority request designation, via the main processor 202 for example. Thus, the communication system 200 may be enabled to dynamically adjust the length of sniff intervals to be, wherein the WiFi transceiver 210 may be interrupted less frequently during WiFi transmission and/or reception operations the communication system 200 may be enabled designated, dynamically, only some of the sniff packets as high priority request communication, wherein transmission and/or reception of WiFi packets, for example, the WiFi transceiver 210 may be preempted less frequently preempt transmission of sniff packets.

In an embodiment of the invention, the communication system 200 may also be enabled to allow re-programmability of predication based processing operations. For example, the main processor 202, the memory 204, the baseband processor 206, the WiFi RF transceiver 210, and/or the Bluetooth RF transceiver 212 may be reprogrammable with modified and/or updated data and/or instructions that may modify management the sniff communication via the communication system 200. The adjustment of the characteristics of the sniff communication and/or the predication related functionality, for example, may be modified, updated, and/or deleted. The initiation of the reprogramming of communication system 200, and/or the data and/or instruction utilized during the reprogrammability may be communicated to and/or from the host device 102 via any of the available interfaces, including, for example, the WLAN link 102.

Modifications and/or adjustments of sniff communication may also cause changes in the characteristics of other wireless interfaces in host devices. For example, increasing duration of intervals between sniff packets and/or priority of the sniff packets may be determined, via the main processor 202 for example, to allow improved throughput of other wireless interfaces, for example via the WLAN link 112. Consequently, the main processor 202 may be enabled to adjust the characteristics of WiFi interface within the host device 102, for example, to utilize the realized improvement in throughput. Alternatively, the system 200 may enable communicating to other device the expected changes in wireless interfaces as a result of adjustments made to the sniff communication. For example, the system 200, where integrated within the host device 102, may enable communicating possible impact on WLAN link 112, as a result of the sniff communication adjustments, to the access point 110, which may then utilize the increased throughput via the wireless network 106.

Figure 3A:
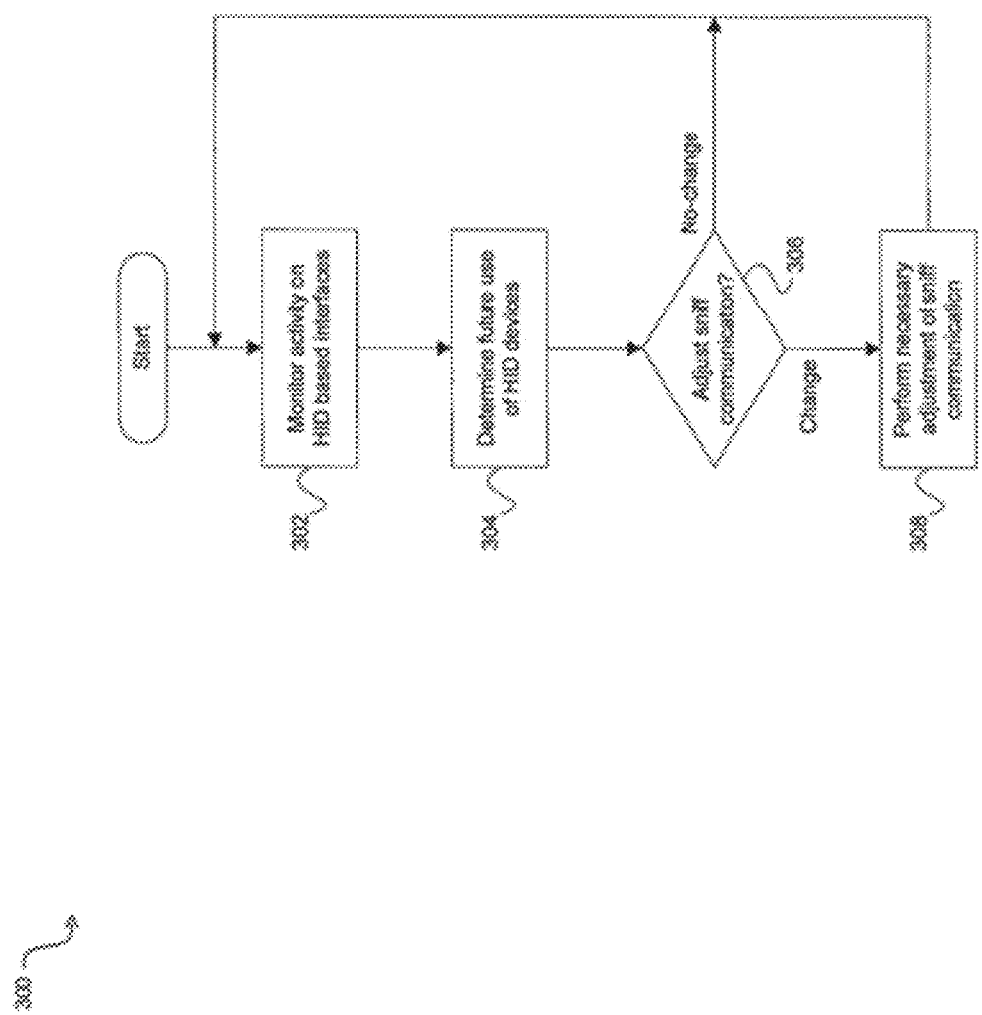
FIG. 3A is a flow chart that illustrates sniff management in a system that supports HID capable wireless interfaces, in accordance with an embodiment of the invention.

FIG. 3A is a flow chart that illustrates sniff management in a system that supports HID capable wireless interfaces, in accordance with an embodiment of the invention. Referring to FIG. 3A, there is shown a flow chart 300 comprising a plurality of exemplary steps, which may enable managing sniff communication via HID capable interfaces.

In step 302, activity on HID capable wireless interfaces may be monitored in a host device. For example, the host device 102 may be enabled, via the communication system 200, to monitor activity via the HID device 104, based on transmission and/or reception via the WPAN link 114, which may be performed via the Bluetooth transceiver 212. The activity of the Bluetooth transceiver 212 may be monitored in the communication system 200, via the main processor 202 for example, to track HID based communication and/or assess corresponding HID based activity. The host device 102 may also set up 'sniff' communication to enable checking for and/or detecting of activity by users via the HID device 104, substantially as described with respect to FIG. 1 and FIG. 2. In step 304, future uses and/or activities via an HID device may be determined or predicted. For example, the host device 102, via communication system 200 for example, may be enabled to determine likely future use of the HID device 104 based on monitored HID based activity. The main processor 202 in the communication system 200, for example, may be enabled to analyze HID communication related information, which may be determined via the Bluetooth transceiver 212, and may be enabled to performed necessary predications of future activity via HID capable interfaces in the communication system 200. The main processor 202 may be pre-programmed to perform the necessary prediction processing operations. The main processor 202 may also be enabled to allow re-programmability of predication based processing operations. In step 306, a determination whether to adjust characteristics of sniff communication may be performed. For example, the host device 102 may determine, via the communication system 200 substantially as described in FIG. 2, whether the length of sniff intervals and/or the need for designating all sniff packets as high priority request communication may be altered, based on determination of the future use of the HID device 104. In instances where it may be determined that no change in the characteristics of sniff communication is necessary, the exemplary steps may return to step 302.

Returning to step 306, in instances where it may be determined that change in the characteristics of sniff communication is necessary, the exemplary steps may proceed to step 308. In step 308, the characteristics of sniff communication may be modified. For example, the host device 102 may be enabled, via the communication system 200, to modify the length of sniff intervals and/or the high priority request designation, based on the determination of future use of the HID device 102, substantially as described, for example, with respect to FIG. 2. The exemplary steps may then return to step 302.

Figure 3B:
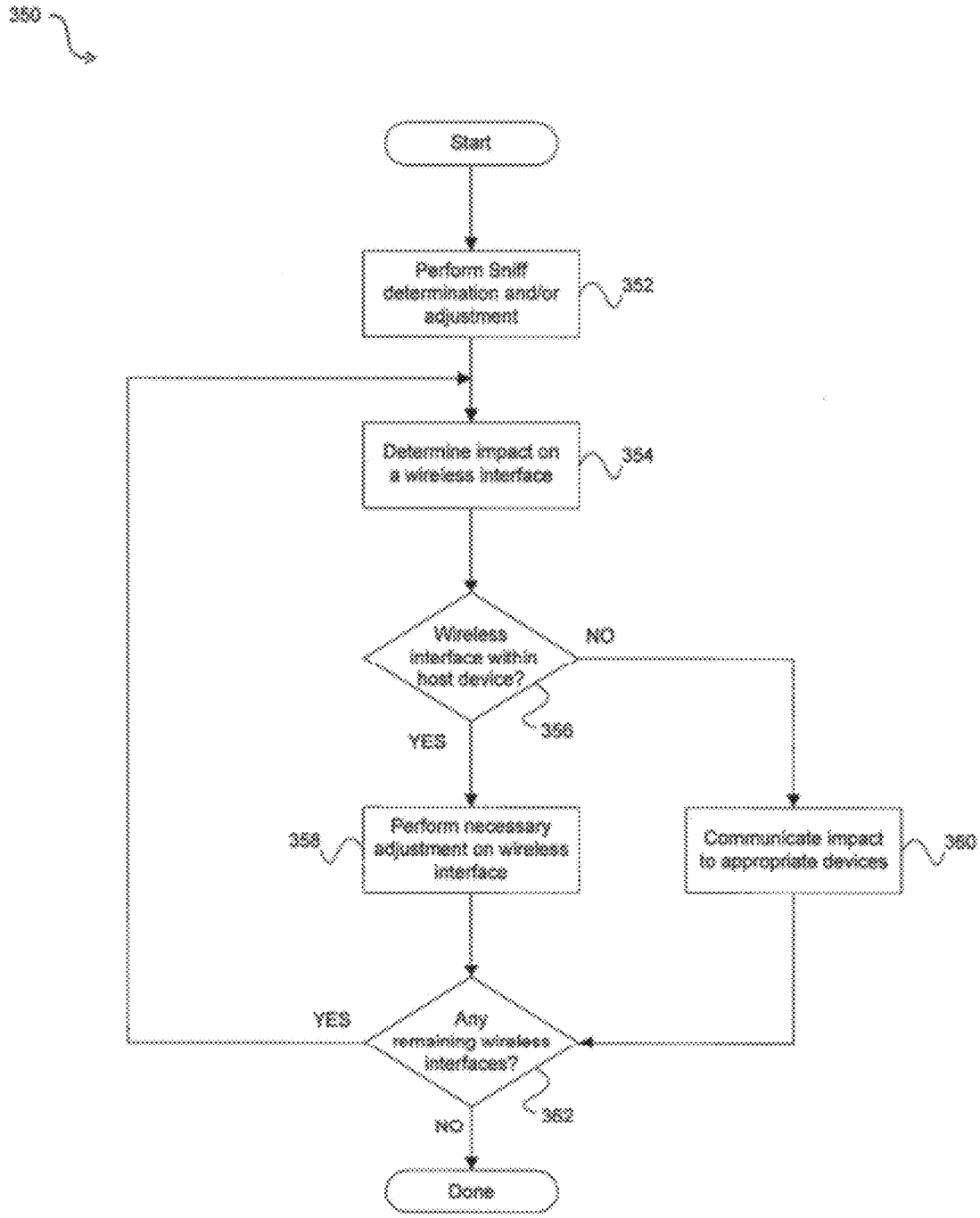
FIG. 3B is a flow chart that illustrates management of other wireless interfaces in a system that supports sniff communication via HID capable wireless interfaces, in accordance with an embodiment of the invention.

FIG. 3B is a flow chart that illustrates management of other wireless interfaces in a system that supports sniff communication via HID capable wireless interfaces, in accordance with an embodiment of the invention. Referring to FIG. 3B, there is shown a flow chart 350 comprising a plurality of exemplary steps, which may enable managing of other wireless interfaces during sniff communication via HID capable interfaces.

In step 352, sniff modifications and/or adjustments may be made. For example, the host device 102 may be enabled to make adjustments and/or modifications to sniff communication, transmitted and/or received via the WPAN link 114, substantially as described, for example, with respect to FIG. 2 and FIG. 3A. In step 354, a determination of impact on another wireless interface may be made. For example, where sniff communication, via WPAN link 114, may be adjusted in host device 102, a determination may be made whether the adjustments to the sniff communication may impact the WLAN link 114. The changes to the sniff communication may, for example, cause potential increase in the throughput in WiFi interface.

In step 356, a determination whether the wireless interface, potentially impacted by sniff communication adjustment, is located within the host device or not may be made. In instances where the impacted wireless interface is integrated within the host device, the exemplary steps may proceed to step 358. In step 358, the adjustments to the impacted wireless interface may be made. For example, in instances where it may be determined in the host device 102 that sniff communication adjustments may impact the WLAN link 114, a WiFi interface for example, in the host device 102, utilized to communicate via the WLAN link 114 may be modified, adjusted or reconfigured.

Returning to step 356, in instances where the impacted wireless interface is external to the host device, the exemplary steps may proceed to step 360. In step 360, the impact on the other wireless interface may be communicated to other devices where the wireless interface may be located. For example, where it may be determined in the host device 102 that sniff communication adjustments may impact the WLAN link 114, the host device 102 may communicate possible impact to the access point 110. The access point 110 may then adjust the WLAN based interfaces based on the communicated impact.

In step 362, a determination whether other wireless interfaces, that may be potentially impacted by sniff communication adjustment, remain may be made. In instances where it may be determined that no other wireless interfaces remain, the exemplary steps may terminate. In instances where it may be determined that some other wireless interfaces may remain, the exemplary steps may loop back to step 354.

Various embodiments of the invention may comprise a method and system for Bluetooth HID activity prediction for wireless coexistence throughput optimization. The host device 104 may be enabled, via the communication system 200, to support a plurality of wireless interfaces, wherein one or more of these wireless interfaces may be utilized to support human interface device (HID) based communication with the HID device 104. The host device 102 may be enabled to monitor activity of the HID device 104 based on communications via the HID capable wireless interfaces and may predict future use of the HID device 104 based on the monitoring.

The host device may be enabled to manage, via the communication system 200, sniff communication which may be utilized in the host device 102, via available HID capable interfaces, to track and/or detect activities in the HID device 104. The management of the sniff communication may comprise adjusting characteristics of the sniff communication to improve and/or optimize throughput of other wireless interfaces available via the host device 102, wherein the dependency between the HID capable interfaces and the other wireless interfaces may be based on proximity of the frequencies used to transmit and/or receive via the wireless interfaces. The HID capable interfaces may comprise wireless personal area network (WPAN) interfaces, which may comprise Bluetooth interfaces. The other wireless interfaces may comprise wireless local area network (WLAN) based interfaces, which may comprise WiFi interfaces. The adjustment of the characteristics of the sniff communication may comprise adjusting, statically and/or dynamically, a length of sniff intervals and/or designating of sniff packets as high priority requests.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for Bluetooth HID activity prediction for wireless coexistence throughput optimization.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
    predicting activity of a human interface device that is communicatively coupled to a host device via a host wireless interface, wherein predicting activity of the human interface device is based on monitoring of past activities of the human interface device; and
    managing sniff communication by the host device based on said prediction, wherein the sniff communication is used by the host device in at least one of detecting or tracking the activity of the human interface device.

2. The method of claim 1, wherein the sniff communication comprises transmission of sniff packets to the human interface device via the host wireless interface.

3. The method of claim 2, wherein the managing the sniff communication comprises:
    adjusting at least one of a priority of transmission of the sniff packets, a length of transmission the sniff packets, and an interval between transmissions of the sniff packets.

4. The method of claim 1, wherein the host wireless interface includes at least one of a wireless personal area network (WPAN) interface and a wireless local area network (WLAN) interface.

5. The method of claim 4, wherein the WPAN interface includes a Bluetooth interface.

6. The method of claim 4, wherein the WLAN interface includes a WiFi interface or a WIMAX interface.

7. The method of claim 1, wherein the host wireless interface is integrated within the host device.

8. The method of claim 1, wherein the monitoring of past activities of the human interface device further includes:
    monitoring of past spatial movements of the human interface device, the spatial movements including at least one of distance, speed, velocity and acceleration of the human interface device.

9. The method of claim 1, further including:
    managing a transmission or a reception via the host wireless interface based on the predicting.

10. The method of claim 1, further including:
    managing a transmission or a reception via a second wireless interface based on the predicting.

11. A system comprising:
    one or more circuits in a host device configured to:
        predict activity of a human interface device that is communicatively coupled to the host device via a host wireless interface, wherein the one or more circuits are further configured to predict activity of the human interface device based on monitoring of past activities of the human interface device; and
        manage sniff communication by the host device based on said prediction, wherein the sniff communication is used by the host device in at least one of detecting or tracking the activity of the human interface device.

12. The system of claim 11, wherein the sniff communication comprises transmission of sniff packets to the human interface device via the host wireless interface.

13. The system of claim 12, wherein the one or more circuits are configured to manage the sniff communication by being further configured to:
    adjust at least one of a priority of transmission of the sniff packets, a length of transmission of the sniff packets, and an interval between transmissions of the sniff packets.

14. The system of claim 11, wherein the host wireless interface includes at least one of a wireless personal area network (WPAN) interface and a wireless local area network (WLAN) interface.

15. The system of claim 14, wherein the WPAN interface includes a Bluetooth interface.

16. The system of claim 14, wherein the WLAN interface includes a WiFi interface or a WiMAX interface.

17. The system of claim 11, wherein the host wireless interface is integrated within the host device.

18. The system of claim 11, wherein the one or more circuits are configured to predict the activity by being further configured to:
    predict activity of the human interface device based on monitoring of past activities of the human interface device by monitoring past spatial movements of the human interface device, the spatial movements including at least one of distance, speed, velocity and acceleration of the human interface device.

19. The system of claim 11, wherein the one or more circuits are further configured to:
manage transmission or reception via a second wireless interface based on the predicting.

20. A non-transitory computer-readable medium having stored thereon computer-executable instructions, execution of which by a computing device cause the computing device to perform operations comprising:
predicting activity of a human interface device that is communicatively coupled to a host device via a host wireless interface, wherein predicting activity of the human interface device is based on monitoring of past activities of the human interface device; and
managing sniff communication by the host device based on said prediction, wherein the sniff communication is used by the host device in at least one of detecting or tracking the activity of the human interface device.

* * * * *

UNITED STATES PATENT AND TRADEMARK OFFICE
CERTIFICATE OF CORRECTION

| | | |
|---|---|---|
| PATENT NO. | : 8,600,427 B2 | Page 1 of 1 |
| APPLICATION NO. | : 13/525913 | |
| DATED | : December 3, 2013 | |
| INVENTOR(S) | : Ibrahim et al. | |

It is certified that error appears in the above-identified patent and that said Letters Patent is hereby corrected as shown below:

Title page, item (63) Related U.S. Application Data, replace "12/178,557" with --12/187,557--.

Signed and Sealed this
Eleventh Day of March, 2014

Michelle K. Lee
*Deputy Director of the United States Patent and Trademark Office*